C. Carlisle
BEST AVAILABLE COPY
Wool Press.
No. 231. A.1. Patented Apr. 26, 1859.
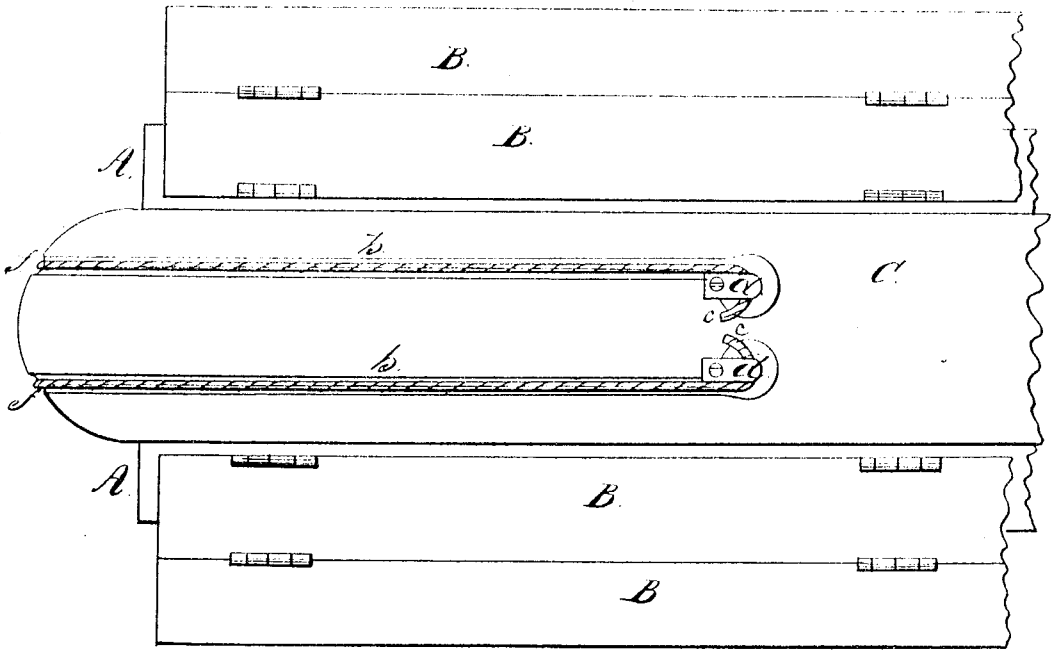
Witnesses:
Nathan T. Churchill
E. A. Baily
Inventor:
Charles Carlisle
AM. PHOTO-LITHO. CO. N.Y. (OSBORNE'S PROCESS)